Feb. 2, 1937. O. E. CLARK 2,069,216
HOSE CONNECTION
Filed March 14, 1935
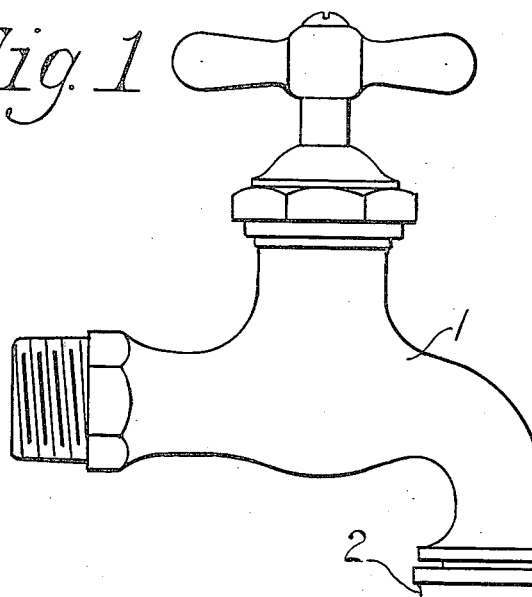
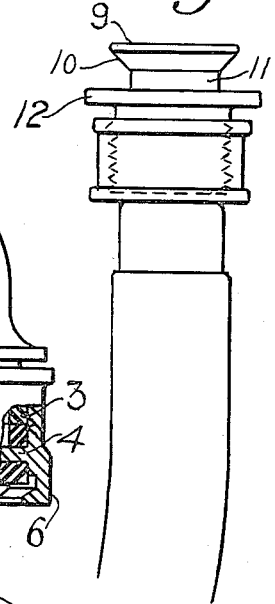
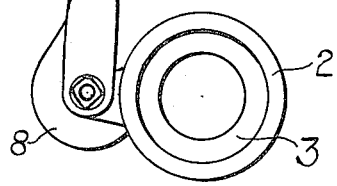
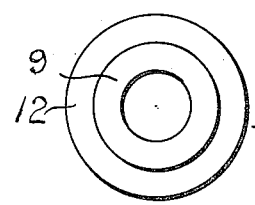
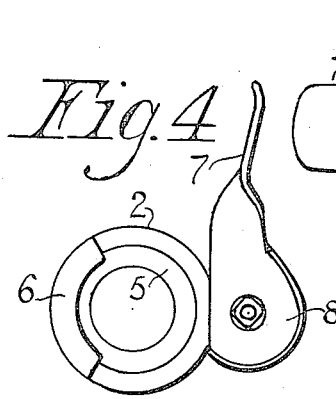
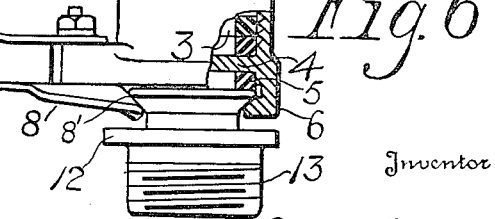
Inventor
Omar E. Clark,
Samuel H. Davis.
By
Attorney Patented Feb. 2, 1937

2,069,216

UNITED STATES PATENT OFFICE 2,069,216

HOSE CONNECTION

Omar E. Clark, Detroit, Mich.

Application March 14, 1935, Serial No. 11,135

1 Claim. (Cl. 285—170)

This invention relates to hose connections, and it may be employed with equal advantage to connect an ordinary hose with a faucet of a household water supply pipe, or to couple one portion of a hose to another for any purpose, and the object of the invention is the provision of devices having special construction and arrangement whereby the hose connection may be easily and quickly made or detached, and which cannot become disengaged or worn in ordinary service.

Illustrating the particular formation and disposition of the parts of this invention is the drawing forming a part of this application.

Fig. 1 of the drawing is a side view of an ordinary faucet showing the body member of this invention attached thereto.

Fig. 2 shows the hose coupling element detached.

Fig. 3 is a top view of the body member and lock or cam lever.

Fig. 4 is a bottom view of the body member as shown in Fig. 3.

Fig. 5 is a top view of the hose coupling.

Fig. 6 is a side view partly sectional showing the body member and hose coupling engaged.

Throughout the drawing and specification the same number is selected to refer to the same part.

Considering the drawing, a faucet 1 has its outlet in engagement with an internally threaded cylindrical member 2. The member is provided interiorly with suitable washers such as 3 which may be compressed against the mouth of the faucet. The member has an annular division wall 4 and below the wall or ring partition 4 is a washer 5 seated within a downwardly projecting portion of the body member forming an inwardly extending lip 6. The lip 6 extends for a part of the way around the bottom of the member as shown in Fig. 4.

On 2, opposite from the lip, is pivoted the operating lever 7 having a cam termination 8 formed with an inclined surface 8'.

To complete the connection in accordance with this invention there is a device termed for the purposes of this description a hose coupling. As shown in Figs. 2 and 5 it has a circular top 9 an inwardly and downwardly extending circular surface 10 connecting the top with a throat 11. The coupling has a flange 12 and the lower portion may be threaded as at 13 in Fig. 6.

In the operation, if the top of the coupling be introduced from the side into the lip 6, a turn of the lever will bring the inclined surface of the cam termination into contact with the annular inclined surface of the coupling, with the result that the washer will be compressed water tight, and the coupling will be locked in the lip of the body member, from which engagement it may be easily detached.

It is found in the use of this invention that the parts cannot become foul or stick, and it is held to be within the purview hereof to fashion the parts of any material and in any shape or size within the terms of this description.

Having now described this invention, I claim:—

A hose connection constructed for attachment to a water serving pipe provided with a threaded end, said connection having an internally threaded cylindrical body portion adapted to engage the threaded end of the water pipe and having a downwardly extending part constructed with an inwardly and downwardly inclined lip, a lever pivotally carried by said body on the opposite side from said lip and provided with a terminal portion having an inclined surface, a hose connection having a flat circular top and a cylindrical throat portion located below the top less in diameter than the top and connected therewith by a portion having an external conical form and adapted to engage the lip of said body, and the said inclined terminal portion of the lever being arranged to engage the said conical part of the connection whereby a movement of the lever in one direction tightens said body portion on the water pipe and forces said connection in the same direction in contact with said body.

OMAR E. CLARK.